(12) United States Patent
Paek et al.

(10) Patent No.: US 6,705,126 B2
(45) Date of Patent: Mar. 16, 2004

(54) METHOD FOR FABRICATING HOLEY OPTICAL FIBER

(75) Inventors: Un-Chul Paek, Kwangju-kwangyokshi (KR); Duk-Young Kim, Kwangju-kwangyokshi (KR); Young-Min Paik, Kyongsanbuk-do (KR)

(73) Assignee: Samsung Electronics Co, Ltd., Suwon (KR)

( * ) Notice: Subject to any disclaimer, the term of this patent is extended or adjusted under 35 U.S.C. 154(b) by 410 days.

(21) Appl. No.: 09/798,706

(22) Filed: Mar. 2, 2001

(65) Prior Publication Data

US 2001/0029756 A1 Oct. 18, 2001

(30) Foreign Application Priority Data

Apr. 18, 2000 (KR) .......................... 2000-20285

(51) Int. Cl.⁷ ............................................ C03B 37/025
(52) U.S. Cl. ........................................ 65/395; 65/393
(58) Field of Search .................. 65/393, 395, 17.2, 65/494; 385/123

(56) References Cited

U.S. PATENT DOCUMENTS

| | | | | |
|---|---|---|---|---|
| 5,802,236 A | * | 9/1998 | DiGiovanni et al. | 385/127 |
| 5,907,652 A | * | 5/1999 | DiGiovanni et al. | 385/125 |
| 5,922,099 A | * | 7/1999 | Yoon et al. | 65/395 |
| 6,299,822 B1 | * | 10/2001 | Yoon et al. | 264/621 |
| 6,418,258 B1 | * | 7/2002 | Wang | 385/125 |
| 6,467,312 B1 | * | 10/2002 | De Hazan et al. | 65/395 |
| 6,470,127 B2 | * | 10/2002 | Voevodkin | 385/123 |
| 6,608,952 B2 | * | 8/2003 | Eggleton et al. | 385/43 |
| 2002/0061176 A1 | * | 5/2002 | Libori et al. | 385/125 |
| 2003/0012535 A1 | * | 1/2003 | Town | 385/125 |
| 2003/0161599 A1 | * | 8/2003 | Broderick et al. | 385/125 |
| 2003/0165313 A1 | * | 9/2003 | Broeng et al. | 385/125 |

* cited by examiner

Primary Examiner—Steven P. Griffin
Assistant Examiner—Carlos Lopez
(74) Attorney, Agent, or Firm—Cha & Reiter, L.L.C.

(57) ABSTRACT

There is provided an apparatus and method for fabricating a holey optical fiber. An optical fiber with air holes of a predetermined size and shape along the length of the optical fiber is drawn by supplying nitrogen gas into air holes through one end of a holey optical fiber preform while heating the other end of the preform.

4 Claims, 3 Drawing Sheets

10

14
16
12

METHOD FOR FABRICATING HOLEY OPTICAL FIBER

CLAIM OF PRIORITY

This application makes reference to, incorporates the same herein, and claims all benefits accruing under 35 U.S.C. Section 119 from an application for APPARATUS AND METHOD FOR FABRICATING HOLEY OPTICAL FIBER, filed with the Korean Industrial Property Office on Apr. 18, 2000 and there duly assigned Serial No. 20285-2000.

BACKGROUND OF THE INVENTION

1. Field of the Invention

The present invention relates generally to an optical fiber, and more particularly to an apparatus and method for fabricating an optical fiber having a plurality of air holes.

2. Description of the Related Art

A holey optical fiber consists of a plurality of submicron-sized air holes running the length of a silica fiber in the cladding layer to confine light (by modified total internal reflection) to a core layer. The holey optical fiber finds its increased applications as a waveguide with novel properties for dispersion compensated fiber communications, non-linear fiber and grating applications, and optical fiber amplifications.

Basically, the holey optical fiber includes a dielectric structure with a refractive index that varies periodically across a transverse plane but is uniform in the normal direction. This dielectric structure causes Bragg diffraction and allows the holey optical fiber to have a "photonic band gap" at a specific wavelength or with respect to a light wave propagation direction. The "photonic band gap" refers to a condition in which light of certain frequencies will not propagate in the material and is analogous to the familiar electronic band gap, except that it applies to photons instead of electrons.

Accordingly, light can behave in unfamiliar ways, traveling along the holey optical fiber due to the photonic band gap effect and the reflective index characteristics. For details, see T. A. Birks, et. al., Electronic Letters, vol. 31(22), p. 1941, October, 1995 and J. C. Knight, et. al., Proceeding of OFC, PD 3-1, February, 1996.

In the conventional method of fabricating the holey optical fiber, an optical fiber preform is typically formed by arranging a plurality of hollow cylindrical glass tubes with a predetermined form along the cladding layer. At the same time, a core preform rod is inserted to be used depending on the application purposes, i.e., as an optical fiber amplifier, an optical fiber grating, or a non-linear optical fiber. Thereafter, the ends of the glass tubes are sealed, then the optical fiber is drawn from the preform. Accordingly, the resulting optical fiber has a plurality of submicron-sized air holes in the cladding.

In the conventional holey optical fiber, however, the outer air holes are typically closed or are much smaller than the inner air holes of the fiber. Hence, during the drawing of an optical fiber from the preform, relatively large inner air holes are transformed to an oval shape since the outer glass tubes are melted faster than the inner glass tubes due to the difference in the heat conductivity between the inner portion and the outer portion of the optical fiber preform. This type of distortion in the air holes makes the continuous mass production of holey optical fibers very difficult.

SUMMARY OF THE INVENTION

It is, therefore, an object of the present invention to provide an apparatus and method for fabricating a holey optical fiber by vertically arranging a plurality of glass tubes in a gel to prevent the distortion of air holes during the drawing step of the optical fiber.

According to another aspect of the invention, the method for fabricating the holey optical fiber is executed as follows. A sol is first formed by mixing a starting material, deionized water, and an additive. The sol is filled into a circular frame and gelled, and a preform rod is inserted into the center of the resulting gel. Meanwhile, a plurality of glass tubes is vertically arranged around the preform rod in the gel. Then, the gel is removed from the circular frame and dried. The dry gel is glassified through a heat application during the sintering process. Thereafter, the holey optical fiber is drawn from the holey optical fiber preform resulting from the sintering process by supplying gas into the ends of the air holes in the holey optical fiber preform while heating the other ends of the air holes.

According to further aspect of the invention, the apparatus for fabricating the holey optical fiber, as described in the preceding paragraphs, is installed by the following means. One end of the holey optical fiber preform is sealed with a preform cover. A gas supplier supplies gas into the preform cover. A pressure regulator regulates the amount of gas supplied from the gas supplier to be constant. A heater is installed at the other end of the holey optical fiber preform for heating the other end of the preform to draw an optical fiber.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described hereinbelow with reference to the accompanying drawings. For the purpose of clarity, well-known functions or constructions are not described in detail as they would obscure the invention in unnecessary detail.

Figure 1:
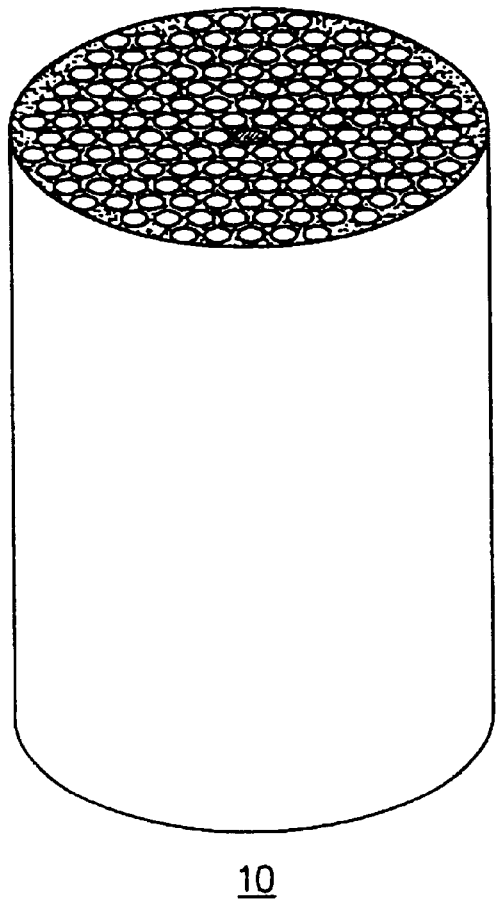
FIG. 1 is a perspective and plan view of a holey optical fiber preform according to a preferred embodiment of the present invention.
Figure 1:
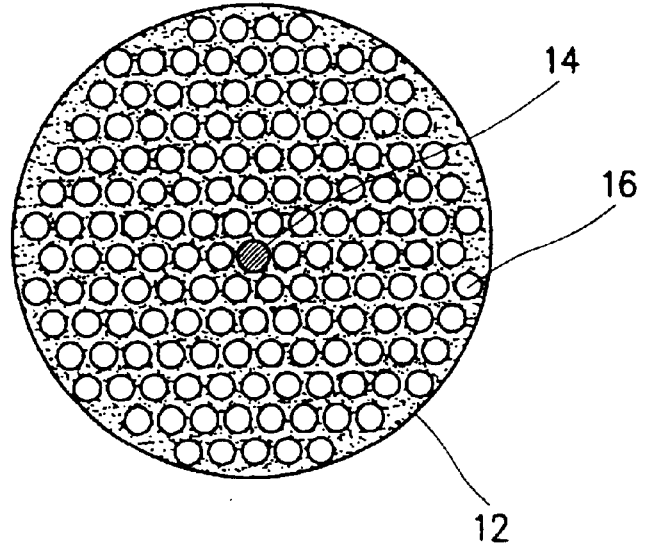

FIG. 1 is a perspective and top view of a holey optical fiber preform according to a preferred embodiment of the present invention. Referring to FIG. 1, the holey optical fiber preform 10 includes a cladding 12 and a core 14. The cladding 12 has an array of air holes 16. The cladding 12 exhibits a lower refractive index than the core 14 and is formed by a pure silica or a fluorine-doped silica. The core 14 shows a higher refractive index than the cladding 12. The core part 14 may be formed by an erbium or germanium-doped silica. The air holes 16 are arranged in a hexagonal shape similar to a beehive, but it should be understood that different shapes are possible in the arrangement of the air holes 16.

Figure 2:
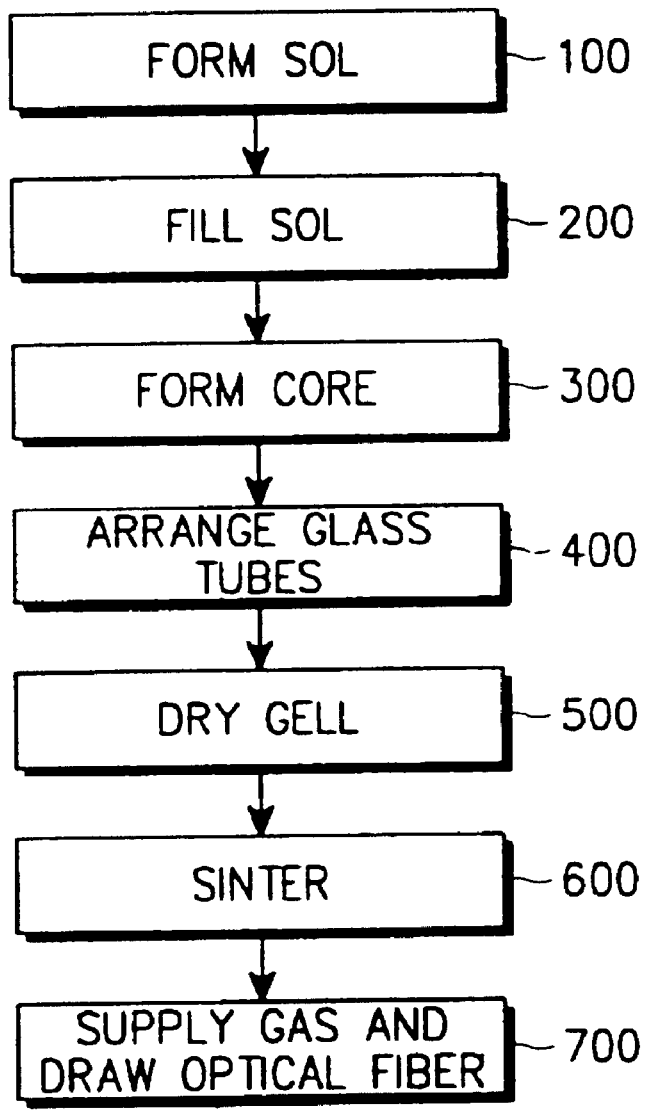
FIG. 2 is a flowchart illustrating a method of fabricating a holey optical fiber according to the preferred embodiment of the present invention; and, FIG. 3 is a schematic view of a holey optical fiber fabricating apparatus according to the preferred embodiment of the present invention.

FIG. 2 is a flowchart illustrating a holey optical fiber fabricating method according to the preferred embodiment of the present invention. Referring to FIG. 2, the holey optical fiber fabricating method includes the steps of sol formation (step 100), sol filling (step 200), preform rod installation (step 300), arrangement of a plurality of glass tubes (step 400), drying of a gel (step 500), gel sintering (step 600), and gas supplying/optical fiber drawing (step 700).

In step 100, a sol is formed by mixing a starting material, a deionized water, and an additive. The starting material may be famed silica or silicon alcoxide. The additive can be a dispersing agent, a catalyst, or a binder.

In step 200, the sol prepared in step 100 is poured into a circular frame.

In step 300, the sol is gelled and a preform rod is inserted into the center of the resulting gel. The preform rod is formed by a silica which is doped with dopant additives, such as erbium or germanium, to control the characteristics of the optical fiber.

In step 400, a plurality of glass tubes made of pure silica whose diameter is in the order of 1–2 mm are vertically arranged around the preform rod in the gel. The glass tubes defines the boundary layers in a cladding part to form air holes in the optical fiber.

In step 500, the gel is removed from the circular frame and dried at constant-temperature in a constant-humidity chamber where a predetermined temperature and predetermined relative humidity are maintained. After the gel drying step 500, it is preferable to perform the heat treatment at low temperature in accordance with the embodiment of the present invention. The dry gel is loaded into a low-temperature heat-treatment device and then thermally treated while supplying chlorine, helium, and oxygen gases in order to dissolve any residual moisture and/or organic materials (i.e., the binder) and remove any metallic impurities and hydroxy groups.

In step 600, the dried gel is glassified through a heat application. That is, the gel after the gel drying step 500 (or the low temperature heat treatment) is glassified through sintering process at high temperature, thereby forming a holey optical fiber preform. The sintering step 600 is performed in a furnace that moves up and down along the holey opitcal fiber preform obtained from step 500 while being exposed to an atmosphere of helium gas and at a temperature above 1300° C.

In step 700, an optical fiber is drawn from the holey optical fiber preform while supplying gases into one end of the air holes of the preform and heating the other end of the air holes. The outer and inner air holes of the holey optical fiber preform 10 are scaled down in size at a predetermined rate without the shape distortion by supplying a predetermined amount of gas at a constant pressure into the air holes, resulting in uniform air holes in the holey optical fiber. To this end, the supply and optical fiber drawing steps are performed using a holey optical fiber fabricating apparatus according to the embodiment of the present invention.

Figure 3:
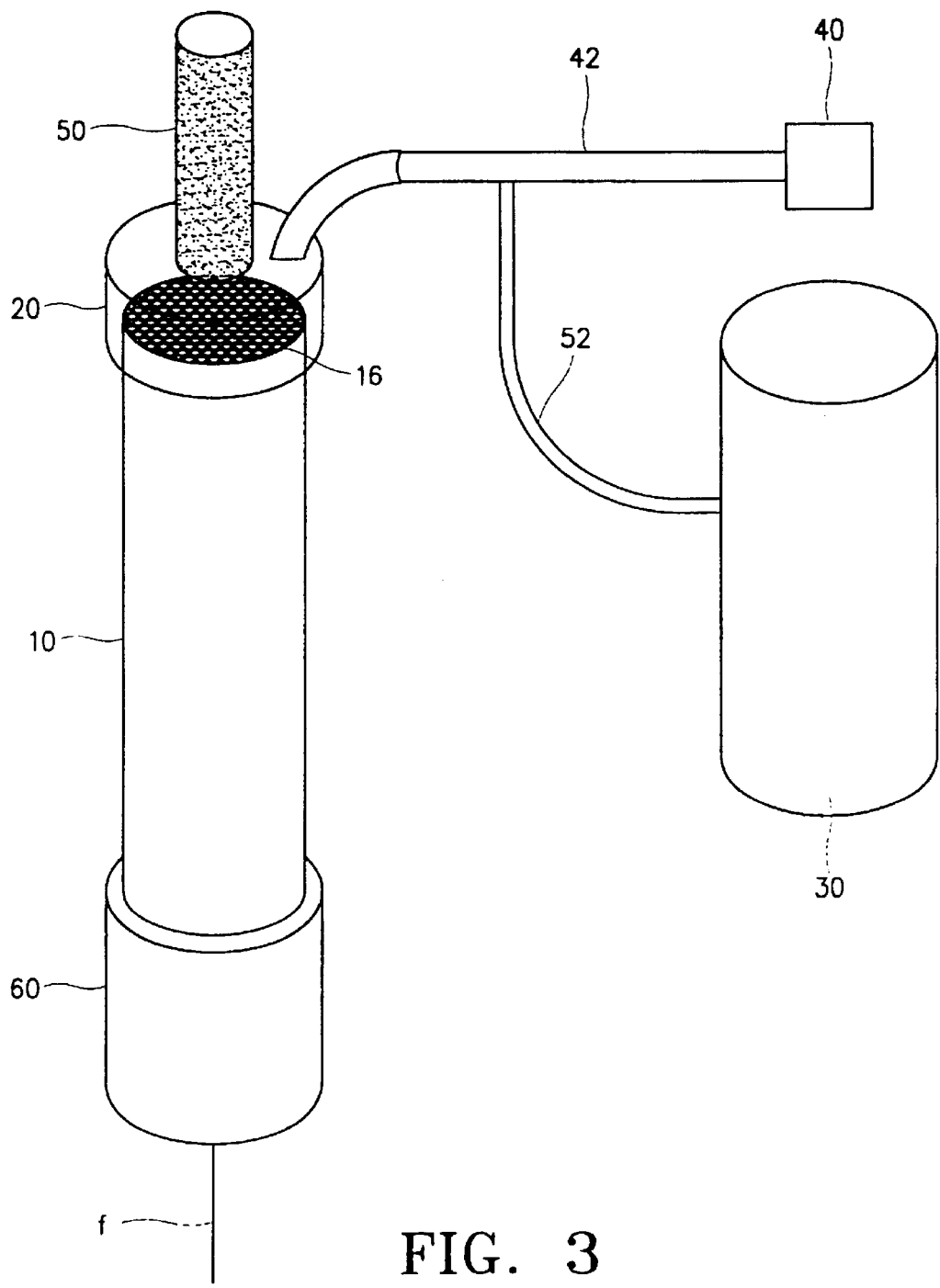

FIG. 3 is a schematic view of the holey optical fiber fabricating apparatus according to the preferred embodiment of the present invention. Referring to FIG. 3, the holey optical fiber fabricating apparatus is comprised of a preform cover 20, a gas supplier 30, a pressure regulator 40, a fixing rod 50, and a stationary heater 60.

The preform cover 20 seals one end of the preform 10 to prevent a leakage of gas supplied to the preform 10. The fixing rod 50 is attached to the upper end of the preform cover 20 and is fixed by a chuck (not shown) of an optical fiber drawing device, to fix the holey optical fiber preform 10 during the drawing of an optical fiber.

The gas supplier 30 supplies gas into the air holes 16 of the holey optical fiber preform 10 through the preform cover 20. The gas is nitrogen. A gas pipe 52 is coupled to the constant pressure pipe 42 so that the gas supplied from the gas supplier 30 can be entered into the preform cover 20.

The pressure regulator 40 serves to control the gas supplier 30 to supply a predetermined pressure inside of the sealed cover 20. The pressure regulator 40 communicates with the gas pipe 52 via a constant pressure pipe 42. The gas supplied from the gas supplier 30 using the means of the pressure regulator 40 eliminates errors in size between outer air holes and inner air holes, by preventing distortion of the air holes through continuously applying constant pressure to the pre-installed glass tubes defining the air holes 16.

The heater 60 is disposed at the other end of the holey optical fiber preform 10 and heats the preform 10 for drawing the optical fiber. A winder (not shown) and a spool (not shown) are installed under the heater 60 to wind a drawn optical fiber.

In accordance with the apparatus and method for fabricating a holey optical fiber as described above, a predetermined amount of gas is constantly supplied into the air holes of a holey optical fiber preform during the drawing of an optical fiber from the preform, thereby preventing distortion of air holes and allowing a mass production of holey optical fibers with uniform characteristics.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method of fabricating a holey optical fiber, comprising the steps of:
   (a) forming a sol by mixing a starting material, deionized water, and an additive;
   (b) pouring the sol into a circular frame to form a gel;
   (c) inserting a preform rod at the center of the gel;
   (d) vertically arranging a plurality of glass tubes around the preform rod located in the center of the gel;
   (e) removing the gel from the circular frame to dry the gel;
   (f) sintering the dried gel under a heat application to form a preform; and,
   (g) drawing the holey optical fiber from the sintered preform while supplying gas into one end of the sintered preform and heating at the other end.

2. The method of claim 1, further comprising the step of thermally treating the dried gel at a predetermined temperature to remove impurities from the gel after executing the step (e).

3. The method of claim 1, wherein the preform rod is formed by an erbium-doped silica.

4. The method of claim 1, wherein the preform rod is formed by a germanium-doped silica.

* * * * *